United States Patent [19]

Hinze

[11] 3,865,853

[45] Feb. 11, 1975

[54] HYDROGENATION OF FATTY ACIDS AND THEIR TRIGLYCERIDES USING A PD(II) CATALYST IN AN ION-EXCHANGE RESIN

[75] Inventor: Adriën George Hinze, Dordrecht, Netherlands

[73] Assignee: Lever Brothers Company, New York, N.Y.

[22] Filed: Jan. 24, 1973

[21] Appl. No.: 326,316

[30] Foreign Application Priority Data
Jan. 25, 1972 Great Britain...................... 3426/72

[52] U.S. Cl.................. 260/409, 252/430, 260/2.1, 260/2.2
[51] Int. Cl....... C11c 3/12, B01j 11/16, C08f 27/06
[58] Field of Search..................................... 260/409

[56] References Cited
UNITED STATES PATENTS

| 2,520,440 | 8/1950 | Sanders............................... | 260/409 |
| 2,861,045 | 11/1958 | Langer, Jr............................ | 252/430 |
| 2,948,742 | 8/1960 | Zajcew................................ | 260/409 |
| 3,578,609 | 5/1971 | Haag et al........................... | 252/430 |
| 3,663,479 | 5/1972 | Lovegren et al..................... | 252/429 |

FOREIGN PATENTS OR APPLICATIONS 1,112,047 8/1961 Germany

OTHER PUBLICATIONS

Harada et al., Chemical Abstracts, Vol. 73, 45813r, (1970).
Linarte Lazcano et al., Chemical Abstracts, Vol. 75, 48090e, (1971).
Solkolskii et al., Chemical Abstracts, Vol. 60, 10936c, (1964).

Primary Examiner—Lewis Gotts
Assistant Examiner—Diana G. Rivers
Attorney, Agent, or Firm—Melvin H. Kurtz, Esq.; Arnold Grant, Esq.; James J. Farrell, Esq.

[57] ABSTRACT

A process for the highly selective hydrogenation of polyunsaturated fatty acids and their triglycerides to the monounsaturated compounds using a homogenous Pd(II) catalyst in an ion-exchange resin and a process for improving the carrier properties for this and other reactions of ion-exchange resins are described. The resin's properties are improved by treatment with base or acid, without changing the number of active sites by more than 25% until the percentage of active sites readily accessible to large molecules is increased by at least 20%. In the hydrogenation process the Pd(II) is introduced into the salt-form of cation-exchange resins and into the hydroxyl or neutral form of anion-exchange resins.

1 Claim, No Drawings

HYDROGENATION OF FATTY ACIDS AND THEIR TRIGLYCERIDES USING A PD(II) CATALYST IN AN ION-EXCHANGE RESIN

The invention relates to the hydrogenation of unsaturated fatty acids using a supported palladium catalyst, to a process for preparing a support-material particularly suitable for such a catalyst, to supported metallic catalysts supported in such support-materials and to catalytic processes using such supported metallic catalysts.

In this specification the term "fatty acids" is used to cover free fatty acids and their derivatives, such as esters and amides. Fatty acids are $C_6$ to $C_{26}$, preferably $C_{12}$ to $C_{22}$, carboxylic, especially straight-chain, acids.

Supported metallic catalysts are a well-known general class of catalysts and many reactions are known in which such catalysts can be used. An example is the use of nickel-on-silica catalysts in the hydrogenation of unsaturated fatty acids. The use of noble metals in or on a support-material has also been proposed for this reaction. Although it has been stated that such catalysts containing noble metals have advantages, these have not been sufficiently large to overcome the disadvantages of cost and such catalysts have not been generally accepted for the hydrogenation of fatty acids.

It has now been found that polyunsaturated fatty acids can advantageously be hydrogenated in the presence of a polar solvent and a catalyst comprising Pd(II) in a support-material. During the whole of the hydrogenation Pd(II) must be present. The polyunsaturated fatty acids are, for example, in the free form or as esters, preferably as triglyceride oils. (Polyunsaturated fatty acids are fatty acids containing more than one carbon-carbon double bond.) Free polyunsaturated fatty acids and their derivatives can be selectively hydrogenated by use of this process to the monounsaturated compounds containing surprisingly little trans-isomers.

It is particularly significant that free polyunsaturated fatty acids can be hydrogenated selectively using the process of the invention; normally selective catalysts are poisoned by free fatty acids.

The process is particularly important for the selective hydrogenation of fatty acids containing minor quantities, i.e. less than 20%, especially less than 15%, of polyunsaturated fatty acids and major quantities of monounsaturated fatty acids; with most, perhaps all, other selective-catalysts with such fatty acids excessive quantities of transmonounsaturated fatty acids are formed. Thus using this process high purity oleic acid and useful cocoa-butter substitutes can be prepared. Cocoa-butter substitutes of excellent quality can for example be prepared by hydrogenation of triglyceride oils containing a high proportion of SUS triglycerides where S is palmitic or stearic and U is a mixture of oleic with a small proportion of linoleic or more highly unsaturated fatty acids.

Suitable hydrogenation conditions include 0° to 100°C and 1 to 5 atm.$H_2$. But for instance lower and higher pressures of $H_2$ can be used if disadvantages are tolerated. Preferred temperatures are 20°C to 80°C, particularly 30°C to 50°C.

The catalyst used in the process according to the invention is an excellent catalyst at low temperatures and low pressures. A further advantage is the small quantity of palladium that need be used.

Preferred support-materials are ion exchange resins, particularly resins based on copolymers of styrene and divinyl benzene. The resin should preferably be stable at 30°C, i.e. the exchange capacity should not be significantly altered by treatment with strong aqueous base for 24 hours at 30°C.

There is a very wide literature on the preparation, structure and properties of ion exchange resins. Reference can be made to manufacturers' hand-books and brochures and to standard text-books such as F. Helffrich, Ion Exchange, McGraw-Hill, 1962; R. Kunin and R. J. Myers, Ion Exchange Resins, John Wiley and Sons; and K. Dorfner Ionenaustauscher, 1964.

Cation exchange resins are preferably converted to the salt form, preferably the alkali-metal salt form, before introduction of Pd(II). It should be noted that most cation exchange resins are supplied as their sodium salts.

Pd(II) is preferably introduced using $PdX_2$ where X is an anion such that $PdX_2$ is soluble, for instance chloride.

Anion exchange resins are preferably treated with base to convert them to the hydroxy form or, if the resin is weakly basic, the neutral form before introduction of Pd(II). The amount of halide ion in the resin prior to introduction of Pd(II) should preferably be as low as possible. Pd(II) is preferably introduced using $M_2PdX_4$ where M is an alkali metal or ammonium, preferably sodium, and X is halogen, preferably chlorine.

Under hydrogenating conditions, i.e. in the presence of hydrogen and a polar-solvent, it is believed that the catalytic entity is $[PdX_3H]^{2-}$ or $[PdXH]$ i.e.

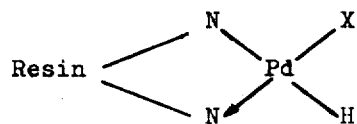

where, for example, the bonds from palladium are connected to ternary amine groups in the resin.

Other, although less favoured, catalysts that can be used in the process of the invention are described by Lazcano and Germain in Bull. Soc. Chim. Fr., 1971 (5) 1869.

NaOH, $Na_2CO_3$, KOH and $K_2CO_3$ are preferred bases for converting cation exchange resins to the salt-form and anion exchange resins to the hydroxyl- or free base-form.

Preferred polar (i.e. dielectric constant greater than 4) solvents are also proton-donors. The use of proton-donors in hydrogenations catalyzed by supported metallic catalysts, but not in hydrogenations as now proposed, is known, for instance from Basu and Chakrabarty, J. Amer. Oil Chem. Soc., 1966, 43, 119 and the Russian literature they cite. Proton-donor polar solvents include alcohols, such as methanol, ethanol and amyl alcohol; ketones such as acetone and methyl ethyl ketone; and lower, $C_2$ to $C_6$, fatty acids such as acetic acid. Polar solvents that are not proton donors include cyclic ethers such as tetrahydrofuran. The volume ratio of polar solvent to the unsaturated fatty acid is preferably above 1:1. For convenience it should preferably not be above 10:1.

In the present process the use of ethanol is preferred and the use of acetone is specially preferred. The amount of water present in the solvent should preferably be less than 10%.

It has been found that the resin should preferably contain at least 0.7 meq./g. of active sites readily accessible to large molecules. Above 1.0 meq./g. and particularly above 2.0 meq./g. marked improvements are obtained.

The amount of active sites accessible to large molecules can be determined for strongly acidic resins by titration with safranine. For weakly acidic and weakly and strongly basic resins gravimetric methods can be used, for instance to measure the amount of chloride ions displaced by the sodium salt of anthraquinone-2-sulphonic acid from a strongly basic resin in the Cl⁻ form. The sites readily accessible to large molecules will be considered in this specification to be the amount determined as explained above after five minutes contact with, for basic resins, anthraquinone-2-sulphonic acid or its sodium salt and, for acidic resins, safranine in either the hydroxyl or chloride form.

It has also been found that the percentage of sites readily accessible to large molecules should preferably be greater than 40% of the total available sites. The total available sites can be measured by standard techniques e.g. A.I. Vogel, Quantitative Inorganic Analysis, 3rd Ed., London, 1965. When the percentage is greater than 50%, particularly when greater than 60%, marked improvement is obtained.

As indicated in the first paragraph of this specification a process has also been discovered for preparing a support-material particularly suitable for a Pd(II) catalyst as described but the support-material is not only used with advantage for such a catalyst. It has been found that the properties of an ion exchange resin as a support material for metallic catalysts are surprisingly improved by increasing the percentage of active sites readily accessible to large molecules by at least 10%, preferably by at least 20%. The percentage is measured as described above.

The percentage can be increased, for example, by treatment with acid, or preferably with base. Treatment with base is preferred, at least when the resin, containing Pd(II), is to be used in a process according to the invention because the preferred step of converting a cation exchange resin to salt-form or an anion exchange resin to OH— or free base form is superfluous. If the resin contains quaternary ammonium or more basic groups, it is preferably treated with a strong base (i.e. fully ionized in water). Weak anion-exchange resins are preferably treated with weak base. The base or acid used in the treatment should preferably be in aquous solution. The treatment should be continued till the desired change in the percentage, preferably also the preferred amount, of active sites readily accessible to large molecules has been achieved. The treatment should preferably not cause a change in the number of total active sites of more than 25% since it has been found that outside this limit the resins are difficult to separate from the treatment-liquor. Suitable treatment for most resins is 10 hours at room temperature but simple experiment is advisable to check suitable conditions for a given resin and for a change in one variable as for instance when, as is preferred, the treatment takes place at above 80°C. Usually a preferred treatment is at reflux for 4 hours in a 5% solution of strong base.

Increasing the percentage of active sites that are readily accessible to large molecules is particularly advantageous with resins based on a polymer of styrene and divinylbenzene. The mechanism by which such treatment improves the properties of the resins as support-materials for metallic catalysts is not fully understood. It is not merely an increase in the surface-area, as is caused by swelling agents, of the resin. This is shown by the fact that with many resins the surface-area is not substantially affected by the treatment. It should also be noted that macroreticular resins are also improved by the treatment.

The resins obtained by the above treatment are particularly useful in the process, as described, for hydrogenating polyunsaturated fatty acids using a supported Pd(II) catalyst in a polar solvent described above. The resins are also useful as supports for other metallic catalysts, particularly heavy metal catalysts, and in other reactions.

A further aspect of the invention are metallic catalysts, particularly of the Pd(II)-type, in ion exchange resins obtained by the above treatment.

All percentages and figures in this specification are by weight unless otherwise stated.

The invention will now be illustrated by the following examples and comparative experiments.

The examples are divided into three types: Examples A are processes for preparing modified support-materials; Examples B are catalysts on such support-materials and Examples C are catalytic processes.

EXAMPLES A1 to 8

The following anion exchange resins were used as the support (all supplied as the chloride): Resin A (Trade Name: Amberlite IRA-400)

This was a strongly basic anion exchanger based on polystyrene matrix cross-linked with about 3 to 5% of divinyl benzene. Its basic character was derived from quarternary ammonium groups. The total active sites were 3.8 meq/g. Resin B (Trade Name: Permutite, De-Acidite G-IP (SRA 99))

This was a weakly basic anion exchange resin, containing diethylamino groups on a polystyrene matrix cross-linked with divinyl benzene. Resin C (Trade Name: Permutite, De-Acidite H-IP (SRA 129))

This was a mixed base anion exchange resin containing tertiary amino and quaternary ammonium groups on a polystyrene matrix cross-linked with divinyl benzene 7–9%. The total active sites were 3.8 meq/g. Resin D (Trade Name: Permutite, De-Acidite FF-IP (SRA 61))

This was a strongly basic resin containing quaternary ammonium groups on a polystyrene matrix cross-linked with 1–3% divinyl benzene. The total active sites were 1.5 – 2.0 meq/g.

10 g samples of each of the resins in granular form were stirred overnight at room temperature with aqueous 5% $Na_2CO_3$ or 5% NaOH and then filtered and washed with water.

In all eight examples the percentage of active sites readily accessible to large molecules is increased by at least 10%. Examples A1, A2, A3 and A4 were the resins obtained by treating resins A, B, C and D with $Na_2CO_3$. Examples A5, A6, A7 and A8 were the resins obtained by treating resins A, B, C and D with NaOH.

EXAMPLES B1 to 8

Each of the resins of Examples A1 to 8 were added to a solution of 250 mg $K_2PdCl_4$ in 250 ml water. After 5 h stirring the catalysts obtained (Examples B1 to 8 respectively) were filtered off, washed with water and ethanol and dried under vacuum.

Table I gives the appearance of the catalysts of Examples B1 to 8.

TABLE I

| Example (B) | Appearance |
| --- | --- |
| 1 | brown powder |
| 2 | green powder |
| 3 | yellow powder |
| 4 | brown powder |
| 5 | red powder |
| 6 | orange granules |
| 7 | orange granules |
| 8 | brown powder |

EXAMPLES C1 to 20

The catalysts of Examples B1 to 8, which are thus examples of one aspect of the invention, were tested for their activity in the hydrogenation of unsaturated fatty acids using free fatty acids from tallow, refined palm oil and free fatty acids from palm oil. The results are given in Tables II and III.

TABLE II

| Example (C) | Example (B) | IV | Trans | $C_{16}$ | $C_{18}$ | $C_{18}^-$ | $C_{18}^=$ |
| --- | --- | --- | --- | --- | --- | --- | --- |
| Tallow free fatty acids | | 56.6 | 6 | 23 | 15.5 | 38.7 | 7.0 |
| 1 | 2 | 50.0 | 11 | 24.8 | 17.0 | 41.6 | 2.5 |
| 2 | 3 | 51.1 | 11 | 24.9 | 17.9 | 39.8 | 3.3 |
| 3 | 4 | 50.1 | 13 | 24.7 | 17.5 | 41.0 | 2.4 |
| 4 | 7 | 46.6 | 11 | 24.8 | 17.7 | 41.6 | 2.1 |
| 5 | 8 | 47.2 | 11 | 24.9 | 17.5 | 42.2 | 2.0 |
| Palm oil | | 55.0 | 0 | 45.2 | 4.5 | 38.5 | 10.1 |
| 6 | 1 | 43.8 | 5 | 45.1 | 6.9 | 43.5 | 2.8 |
| 7 | 2 | 43.7 | 7 | 44.8 | 5.3 | 46.7 | 1.5 |
| 8 | 6 | 44.6 | 11 | 46.5 | 6.8 | 46.8 | 3.5 |
| 9 | 7 | 43.6 | 8 | 46.3 | 5.2 | 46.1 | 0.9 |
| 10 | 8 | 44.4 | 7 | 46.1 | 5.8 | 43.7 | 2.8 |
| Palm oil free fatty acids | | 55.0 | 0 | 45.2 | 4.5 | 38.5 | 10.1 |
| 11 | 4 | 45.3 | 5 | 45.2 | 7.3 | 43.3 | 2.8 |
| 12 | 5 | 47.1 | 5 | 46.7 | 5.1 | 43.4 | 2.3 |
| 13 | 6 | 46.0 | 9 | 45.4 | 5.4 | 46.1 | 1.3 |
| 14 | 7 | 45.4 | 4 | 46.0 | 4.7 | 45.8 | 2.0 |
| 15 | 8 | 45.9 | 6 | 45.6 | 6.0 | 44.7 | 2.2 |

( - is monoene, = is diene )

TABLE III

Initial rates of hydrogenation in ml/min.

| Example (C) | Example (B) | tallow f.f.a. | palm oil | palm oil f.f.a. |
| --- | --- | --- | --- | --- |
| 8, 13 | 6 | | 2 | 60 |
| 1, 7, 16 | 2 | 10 | 90 | 85 |
| 3, 17, 11 | 4 | 30 | 27 | 90 |
| 2, 18 | 3 | 3 | 12 | |
| 5, 10, 15 | 8 | 42 | 36 | 80 |
| 4, 9, 14 | 7 | 8 | 65 | 85 |
| Comparative Test 1* | | | 0 | 0 |
| 19, 20 | 2 | | 23 | 20 |
| Comparative Test 2* | | | 0 | 0 |
| 6 | 1 | | 4 | |

*Test 1 and Test 2 were the products of treating Resin B and Resin A with $K_2PdCl_4$ as described for Examples B1 to 8.

EXAMPLE C21

A stearin fraction of cottonseed oil was hydrogenated with the catalyst Example B7. Table IV presents the results:

TABLE IV

| Oil | IV | Trans | $C_{16}$ | $C_{18}$ | $C_{18}^-$ | $C_{18}^=$ |
| --- | --- | --- | --- | --- | --- | --- |
| Starting | 98 | 0 | | 2.5 | 17.5 | 47.5 |
| Hydrogenated | 58.2 | 22 | 29.7 | 4.8 | 56.0 | 4.0 |

Conditions: 40°C, 1 atm hydrogen pressure, 0.03% Pd on oil
Solvent: ethanol

Without any purification of the starting oil the hydrogenation took less than 50 min. The filterability of the catalyst was excellent. The dilatations of the hydrogenated product were $D_{15}$: 1100, $D_{20}$: 970, $D_{25}$: 720, $D_{30}$: 480, $D_{35}$: 255 and $D_{40}$: 75. These values can be improved by fractionation of the hydrogenated oil.

The catalyst had the selectivity of a good supported copper catalyst with less trans isomer formation and much greater activity.

EXAMPLE B9

To 10 g of the resin of Example A1 was added 250 mg of $K_2PdCl_4$ dissolved in 250 ml water. After 5 h stirring the catalyst obtained was filtered off, washed with water and then with ethanol and dried under vacuum. The catalyst was found to contain 2% of palladium.

EXAMPLE B10

Example B9 was repeated except that the resin of Example A2 was used instead of the resin of Example A1. The catalyst was found to contain 3% of palladium.

EXAMPLES C22 to 28

Hydrogenations were carried out at 1 atm $H_2$ and 40°-50°C with iso-octane, light petroleum and ethanol as solvents and the catalysts of Examples B9 and B10. The volume ratio substrate : solvent was 1 : 5. Table V gives the results.

In a typical hydrogenation a reactor was charged with 250 mg catalyst, 20 g substrate and 100 ml solvent. The course of the reaction was followed by measuring the hydrogen uptake. After the calculated amount of hydrogen had been taken up, the catalyst was filtered off, washed with light petroleum, dried and reused. Use of a blanket of nitrogen or argon was unnecessary.

TABLE V

| Example (C) | Catalyst | Solvent | $n_D^{65}$ | IV | Trans | $C_{16}$ | $C_{18}$ | $C_{18}^=$ | $C_{18}^{=2}$ | Time (min.) |
|---|---|---|---|---|---|---|---|---|---|---|
| Palm oil | | | 1.4491 | 49.5 | 0 | 46 | 5 | 39 | 10 | — |
| 22 | B9 | Ethanol | 1.4480 | 42.8 | 5 | 45.3 | 7.1 | 44.3 | 1.6 | 12 |
| 23 | B9 | Ethanol | 1.4480 | 42.1 | 6 | 45.2 | 6.1 | 44.8 | 1.9 | 13 |
| 24 | B10 | Ethanol | 1.4481 | 43.7 | 7 | 44.8 | 5.3 | 46.7 | 1.5 | 2 |
| Comparison | B9 | Iso-octane | | | | NO | CHANGE | | | |
| Comparison | B10 | Iso-octane | | | | NO | CHANGE | | | |
| Comparison | B9 | Light Petroleum | | | | NO | CHANGE | | | |
| Palm oil free fatty acids | | | 1.4391 | 55 | 0 | 45.2 | 4.5 | 38.5 | 10.1 | — |
| 25 | B10 | Ethanol | 1.4380 | 46.0 | 9 | 45.4 | 5.4 | 46.1 | 1.3 | 3 |
| 26 | B10 | Ethanol | 1.4350 | 9.0 | | | | | | 150 |
| Tallow free fatty acids | | | | 56.6 | 6 | 15.5 | 38.7 | 7.0 | | — |
| 27 | B10 | Ethanol* | | 50 | 11 | 17.0 | 41.6 | 2.5 | | 14 |
| Olive oil free fatty acids | | | | 87.5 | 0 | | | 67.4 | 11.1 | — |
| 28 | B10 | Ethanol | | 79.1 | 8 | 4.1 | 75.0 | 4.9 | | 5 |
| Comparison | Pd on C' | Ethanol | | 69.0 | 22 | 13.0 | 66.1 | 2.6 | | |

*Comparable results were obtained with methanol
'A standard, good palladium-on-charcoal catalyst

EXAMPLE C29

Example C4 was repeated except that acetone was used as solvent instead of ethanol. The following results were obtained: IV: 48.4; Trans: 11; $C_{16}$: 24.9; $C_{18}$: 17.7; $C_{18}^=$: 42.7; $C_{18}^{=2}$: trace.

EXAMPLE C30

A catalyst prepared as described by Lazcano and Germain, Bull. Chem. Soc. Fr., 1869 (1971) was tested in the hydrogenation of palm oil as described for Examples C8, 7, 17, 18, 10, 9, 19 and 6, except that 0.1% Pd, based on oil, was used. An initial rate of hydrogenation of 4 ml/min. was obtained.

EXAMPLES C31 to 34

Using the conditions described under Examples C1 to 20, except that sufficient catalyst was used to give 0.02% Pd on oil, the catalysts of Examples B7, 11 and 12 were tested in the hydrogenation of palm oil. In Example C33 amyl alcohol was used instead of ethanol and the hydrogenation temperature was 95°C instead of 40°C. The results obtained are given in Table VI.

TABLE VI

| Ex.(C) | Catalyst | Activity | IV | Trans | $C_{16}$ | $C_{18}$ | $C_{18}^=$ | $C_{18}$ |
|---|---|---|---|---|---|---|---|---|
| 31 | B7 | 2.06 | 43.6 | 8 | 46.3 | 5.2 | 46.1 | 0.9 |
| 32 | B11 | 2.85 | 44.4 | 6 | 41.9 | 5.2 | 45.2 | 1.7 |
| 33 | B7 | 2.08 | 43.1 | 11 | 42.5 | 5.4 | 44.1 | 4.0 |
| 34 | B12 | 4.75 | 43.8 | 6 | 45.5 | 5.1 | 45.3 | 1.7 |

*Initial rate in $kmol/m^3$ oil sec.

EXAMPLES C35 to 40

Using the same conditions as used in Example C31 the catalysts of Examples B7 and B8 were tested in the hydrogenation of a variety of fatty acids (triglycerides). The results are given in Table VII ($=$ is triene).

TABLE VII

| Ex. (C) | Cat. | Oil | IV | Trans | $C_{16}$ | $C_{18}$ | $C_{18}^=$ | $C_{18}^{=2}$ | $C_{18}$ |
|---|---|---|---|---|---|---|---|---|---|
| — | — | Crude fancy tallow | 52 | 3.5 | 23.5 | 17.7 | 44.2 | 5.8 | |
| 35 | B8 | do. | 49 | 4 | 24.9 | 19.5 | 40.8 | 4.2 | |
| 36 | B8 | Crude palm oil | 46.8 | 4 | 46.5 | 6.6 | 41.0 | 4.2 | |
| — | — | Mid-fraction of palm oil | 33.4 | 0 | 57.3 | 8.0 | 31.6 | 2.0 | |
| 37 | B7 | do. | 28.3 | 2 | 57.7 | 7.5 | 32.9 | 0.6 | |
| — | — | Top white tallow | 48.7 | 4 | 22.2 | 13.8 | 42.7 | 3.1 | |
| 38 | B7 | do. | 46.8 | 5 | 23.0 | 12.5 | 44.6 | 1.8 | |
| — | — | Cottonseed stearin | 98 | 0 | | 2.5 | 17.5 | 47.5 | |
| 39 | B7 | do. | 58.2 | 22 | 29.7 | 4.8 | 56.0 | 4.0 | |
| — | — | Refined soybean oil | 133 | 0 | 10.9 | 3.9 | 23.1 | 53.1 | 7.5 |
| 40 | B7 | do. | 123 | 6 | 10.9 | 4.4 | 30.1 | 47.7 | 5.0 |

EXAMPLE A9

Example A7 was repeated except that instead of treatment overnight at room-temperature the resin was boiled with the NaOH for 3 hours.

EXAMPLE B11

Example B7 was repeated except that the resin of Example A9 was used instead of that of Example A7. The catalyst obtained was a powder.

EXAMPLE B12

Example B11 was repeated except that $Na_2PdCl_4$ was used instead of $K_2PdCl_4$.

Table VII shows that a cottonseed stearin, produced by dry fractionation, can almost be freed from linoleic residues at the cost of formation of only 2% stearine. To obtain comparable figures with a good copper catalyst requires a longer time and more trans (ca. 35%) is produced.

EXAMPLES C41 to 43

Example C9 was repeated with the differences indicated in Table VIII which also gives the results obtained.

TABLE VIII

| Ex. (C) | Cat. | ppm Pd on Oil | Activity* | IV | Trans | $C_{18}$ | $C_{18}^-$ | $C_{18}^=$ |
|---|---|---|---|---|---|---|---|---|
| 41 | B11 | 200 | 5 | 44.4 | 6 | 5.2 | 45.2 | 1.7 |
| 42 | B11 | 10 | 0.16 | 45.6 | 6 | 6.1 | 41.7 | 4.5 |
| 43 | B12 | 20 | 0.5 | 44.6 | 4 | 4.9 | 43.5 | 2.5 |

*IV/min.

An initial activity of 0.5 IV/min. corresponds to a total hydrogenation time of about 10 min.

The following resins not mentioned previously in the Examples were used in the following Examples.

Resin E: Amberlite IR 4B. This was a weakly basic anion exchange resin (basic strength comparable to ammonium hydroxide) based on a phenol formalhdehyde polymer and deriving its basic properties from aromatic amino-groups. It was supplied by the manufacturer in the free base (OH) form.

Resin F: Amberlite IRA 938. This was a macroreticular, strongly basic anion exchange resin with "pores" of between 25,000 and 230,000 A diameter. It was based on a polymer of styrene cross-linked with divinyl benzene. Quarternary ammonium groups provided the basicity. It was supplied in the chloride-form.

Resin G: Amberlite IRA 93. This was a macroreticular, weakly basic anion exchange resin with very large pores. The basic, functional groups were tertiary amine groups. The resin is polystyrene cross-linked with divinyl benzene. It was supplied as the free base.

Resin H: Amberlite IRA 45. This was a basic anion exchange resin based on polystyrene cross-linked with divinyl benzene. Its basicity was comparable to that of di-n-propylamine. It was supplied as the free base.

Resin I: Amberlite IRA 401. This was a more porous analogue of resin A. Its cross-linking percentage was less than 2%.

Resin J: Dowex 1 × 8. This was a strongly basic anion exchange resin containing benzyl-trimethyl ammonium active groups on polystyrene cross-linked with 8% divinyl benzene. It was supplied in the chloride-form.

EXAMPLE A10

Resin E was boiled with a 5% NaOH solution for 3 hours.

EXAMPLE B13

10 g of resin E was impregnated with 300 mg of $K_2PdCl_4$ dissolved in 100ml water for 15hours. The filtrate was yellow indicating incomplete impregnation.

EXAMPLE B14

Example B13 was repeated except that the resin of Example A10 was used.

EXAMPLE A11

10g of resin F was treated with 5% NaOH at room-temperature for 24 hours.

EXAMPLE B15

The resin from Example A11 was impregnated with 280 mg $Na_2PdCl_4$ in 100 ml water for 6 hours. 3g of catalyst was obtained.

COMPARATIVE EXPERIMENT A

Example B15 was repeated except that resin F was used instead of the resin of Example A11.

EXAMPLE B16

7g of resin G was impregnated with 280 mg $Na_2PdCl_4$ dissolved in 100ml water for 15hours.

EXAMPLE A12

10 g of resin G was boiled with a 5% NaOH solution for 3 hours.

EXAMPLE B17

The resin of Example A12 was impregnated with 280 mg $Na_2PdCl_4$ dissolved in 100 ml water for 15 hours.

EXAMPLE A13

10 g of resin H was boiled with a 5% NaOH solution for 3 hours.

EXAMPLE B18

The resin of Example A13 was impregnated with 280 mg $Na_2PdCl_4$ dissolved in 100 ml water for 15 hours.

EXAMPLE B19

Example B18 was repeated except that resin H was used instead of the resin of Example A13.

EXAMPLE A14

10 g of resin I was boiled with a 5% NaOH solution for 3 hours.

EXAMPLE B20

The resin of Example A14 was impregnated with 280 mg $Na_2PdCl_4$ dissolved in 100 ml water for 15 hours.

EXAMPLE A15

Example A12 was repeated except that the resin was boiled with a 5% $Na_2CO_3$ solution for 4 hours instead of with a 5% NaOH solution for 3 hours.

EXAMPLE B21

Example B17 was repeated using the resin of Example A15 instead of that of Example A12.

EXAMPLE A16

Example A13 was repeated using 5% $Na_2CO_3$ for 4 hours instead of 5% NaOH for 3 hours.

EXAMPLE B22

Example B18 was repeated using the resin of Example A16 instead of that of Example A13.

EXAMPLES C44 to 51

The activity of some of the above catalysts was tested in the hydrogenation of a palm oil, 30 g in 136 ml ethanol, at 40°C and 1 atm $H_2$. Table IX gives the results obtained.

TABLE IX

| Ex. (C) | Cat. | Amount ppm[1] | Initial rate[2] | Total time[3] | IV | Trans | $C_{16}$ | $C_{18}$ | $C_{18}^-$ | $C_{18}^=$ |
|---|---|---|---|---|---|---|---|---|---|---|
| Starting oil | — | — | — | — | 0 | 45.6 | 4.3 | 38.5 | 10.8 | |
| 44 | B15 | 150 | 5 | 73 | 41.7 | 9 | 46.2 | 7.2 | 41.1 | 2.2 |
| 45 | B16 | 225 | 12 | 31 | 41.1 | 9 | 46.3 | 9.1 | 40.3 | 2.7 |
| 46 | B17 | 75 | 12 | 24 | 42.6 | 8 | 47.4 | 5.9 | 43.3 | 1.7 |
| 47 | B18 | 75 | 11 | 86 | 42.2 | 7 | 47.0 | 5.8 | 43.3 | 1.6 |
| 48 | B20 | 75 | 25 | 11 | 42.4 | 6 | 46.8 | 5.3 | 44.8 | 1.4 |
| 49 | B7 | 75 | 22 | 23 | 43.2 | 6 | 46.5 | 5.8 | 43.9 | 2.1 |
| Starting oil | — | — | — | — | 7 | 40.2 | 5.9 | 36.3 | 10.3 | |
| 50 | B21 | 75 | 20 | 16 | 44.9 | 11 | 40.7 | 7.2 | 49.8 | 1.8 |
| 51 | B22 | 75 | 50 | 5 | 45.1 | 11 | 40.6 | 6.5 | 43.3 | 0.5 |

[1] on oil
[2] ml/min
[3] i.e. time to take up 280 ml hydrogen. This is the amount of hydrogen required to decrease the linoleic content from about 11% to about 2%.

EXAMPLES C52 to 55

Catalysts B7 and B20 were tested further in the hydrogenation of 260 g palm oil at 40°C using 1 atm $H_2$. The results are given in Table X.

TABLE X

| Ex. (C) | Cat. | Amount ppm[1] | Solvent[2] | Total time[3] | Trans | $C_{16}$ | $C_{18}$ | $C_{18}^-$ | $C_{18}^=$ |
|---|---|---|---|---|---|---|---|---|---|
| Starting oil | | — | — | — | 7 | 40.2 | 5.4 | 36.3 | 10.3 |
| 52 | B7 | 20 | Ethanol | 70 | 14 | 40.9 | 7.1 | 43.1 | 1.5 |
| 53 | B7 | 20 | Acetone | 60 | 13 | 40.5 | 5.7 | 43.9 | 2.0 |
| 54 | B20 | 20 | Ethanol | 103 | | 40.1 | 8.2 | 41.3 | 4.0 |
| 55 | B20 | 45 | Acetone | 110 | | 40.0 | 8.1 | 42.0 | trace |

[1] as C44 – C51
[2] Solvent:Oil = 3:1 (volume)
[3] as C44 – C51

EXAMPLES A17 to 20

Four 10 g samples of resin C were refluxed for 4 hours with a 5% NaOH solution.

EXAMPLES B23 to 26

Each of the resins of Examples A17 to A20 was stirred with a 100 ml aqueous solution of 280 mg $Na_2PdCl_4$ for hours. From each 6 g catalyst was obtained.

EXAMPLE B27

Example B23 was repeated except that $Na_2PdCl_2Br_2$ was used instead of $Na_2PdCl_4$.

EXAMPLE B28

5 g of the resin of Example A17 was stirred with 200 mg $RhCl_3 \cdot 3H_2O$ dissolved in 100 ml water for 15 hours.

EXAMPLE B29

5 g of the rsin of Example A17 was stirred for hours with 200 mg $RhCl_3 \cdot 3H_2O$ dissolved in 100 ml water containing 100 mg NaCl.

EXAMPLE B30

2.3 g of the resin of Example A17 was stirred for hours with 200 mg $Na_2PtCl_4$ dissolved in 20 ml water.

EXAMPLE A21

5 g of resin C was refluxed for 4 hours with a 5% $H_2SO_4$ solution. 3.5 g of resin was obtained.

EXAMPLE B31

The resin of Example A21 was impregnated with $RhCl_3$ as in Example B28.

EXAMPLE B32

The resin of a repeat of Example A21 was impregnated with $RhCl_3$ as in Example B29.

EXAMPLE A22

10 g of resin J was refluxed with a 5% $H_2SO_4$ solution for 4 hours and then with a 5% NaOH solution for 4 hours.

EXAMPLE B33

The resin of Example A22 was stirred with 280 mg $Na_2PdCl_4$ in 100 ml water for 15 hours.

EXAMPLE A 23

10 g of resin C was treated with a 5% NaOH solution in tap-water for 5 hours at 80°C.

EXAMPLE B34

The resin of Example A23 was stirred with 175 mg $PdCl_2$ and 107 mg NaCl dissolved in 100 ml tap-water.

EXAMPLE A24

10 g of resin C was refluxed with a 5% $H_2SO_4$ solution for 4 hours.

EXAMPLE B35

The resin of Example A24 was stirred with 280 mg $Na_2PdCl_4$ in 100 ml water for 15 hours.

EXAMPLE A25

Example A24 was repeated except that after treatment with the $H_2SO_4$ the resin was stirred in a 5% NaOH solution at room temperature for 30 min.

EXAMPLE B36

Example B35 was repeated using the resin of Example A25 instead of that of Example A24.

EXAMPLES C56 to 68

The duplicability of hydrogenations using catalysts according to the invention was tested. The conditions were 40°C, 1 atm $H_2$, 260 g oil and 950 ml ethanol. The results obtained are given in Table XI.

TABLE XI

| Ex. (C) | Oil* | Ex. Cat. (C) | Total $H_2$ Uptake ml | Time min | Amount of catalyst ppm** |
|---|---|---|---|---|---|
| 56 | Palm oil | B24 | 2300 | 32 | 30 |
| 57 | do. | do. | 2380 | 37 | 30 |
| 58 | do. | do. | 2395 | 35 | 30 |
| 59 | do. | do. | 2080 | 70 | 20 |
| 60 | do. | do. | 2300 | 75 | 20 |
| 61 | Mowrah stearin | do. | 1825 | 40 | 40 |
| 62 | do. | do. | 1900 | 43 | 40 |
| 63 | do. | do. | 1975 | 46 | 40 |
| 64 | Cottonseed stearin | B23 | 6500 | 33 | 70 |
| 65 | do. | do. | 6500 | 56 | 70 |
| 66 | do.*** | do. | 7100 | 44 | 70 |
| 67 | do.*** | do. | 7180 | 48 | 70 |
| 68 | do. | do. | 7100 | 50 | 70 |

*see Table XII
**1 ppm = 1 mg Pd/kg oil
***dry fractionated

EXAMPLES C69 to 73

The fatty acid composition of the starting oils used in Examples C56 to C68, of the olive oil free fatty acids used in Example C72 and of the oils hardened using the same conditions as given under Examples C56 to C68, are shown in Table XII. The catalyst used was that of Example B24.

TABLE XII

| Ex.(C) | Oil | Amt. cat. ppm | IV | Trans | $C_{16}$ | $C_{18}$ | $C_{18}^-$ | $C_{18}^=$ |
|---|---|---|---|---|---|---|---|---|
| — | Palm oil | — | — | 0 | 45.6 | 4.4 | 38.5 | 10.9 |
| 69 | | 20 | 43.2 | 6 | 46.5 | 5.8 | 43.8 | 2.2 |
| — | Mowrah stearin | — | — | 2.5 | 30.0 | 26.0 | 31.2 | 11.5 |
| 70 | | 40 | 40.7 | 6 | 31.9 | 24.6 | 38.3 | 3.3 |
| — | Cottonseed stearin | — | 75.0 | 0 | 48.8 | 2.2 | 11.3 | 36.3 |
| 71 | | 40 | 45.6 | 17 | 50.7 | 3.5 | 40.0 | 4.5 |
| — | Olive oil f.f.a. | — | 87.5 | 0 | 14.1 | 3.0 | 67.4 | 11.1 |
| 72 | | 50 | 76.3 | 12 | 14.4 | 4.8 | 75.4 | 3.3 |
| Comp.B* | | 100 | 64.3 | 18 | 13.8 | 15.9 | 64.7 | 2.6 |
| — | Cottonseed stearin*** | | 98.0 | 0 | 29.2 | 2.5 | 17.5 | 47.5 |
| 73 | | | 58.0 | 22 | 29.7 | 4.8 | 56.0 | 4.0 |
| Comp.C** | | | 58.0 | 35 | 29.3 | 4.5 | 56.3 | 4.2 |

*Hydrogenated with a Palladium-on-charcoal catalyst (Engelhardt) at 50°C and 15 atm.$H_2$.
**Hydrogenated with a good copper catalyst at 185°C and 5 atm.$H_2$.
***Dry fractionated.

EXAMPLES C74 to 77

Table XIII gives the results of hydrogenating two qualities of palm oil using 20 ppm of catalyst of Example B24, 40°C, 260 g oil, 950 ml solvent and 1 atm.$H_2$.

TABLE XIII

| Ex. (C) | Solvent | Total reaction time min. | Total $H_2$ uptake ml. | Trans | $C_{16}$ | $C_{18}$ | $C_{18}^-$ | $C_{18}^=$ |
|---|---|---|---|---|---|---|---|---|
| — | Palm oil A | — | — | 7 | 40.2 | 5.4 | 36.3 | 10.3 |
| 74 | Ethanol | 70 | 2300 | 14 | 40.9 | 7.1 | 42.1 | 1.5 |
| 75 | Acetone | 60 | 1850 | 13 | 40.5 | 5.7 | 43.9 | 2.0 |
| — | Palm oil B | — | — | 0 | 45.6 | 4.4 | 38.5 | 10.9 |
| 76 | Ethanol | 70 | 2350 | 6 | 46.5 | 5.8 | 43.8 | 2.2 |
| 77 | Acetone | 75 | 1875 | 6 | 46.5 | 4.8 | 44.2 | 2.1 |

EXAMPLES C78 and 79

Table XIV gives results obtained from the hydrogenation of cottonseed stearin using 40 ppm catalyst B19 but otherwise the conditions used in Examples C74 to 77.

In the examples of this specification cottonseed stearin has been prepared by solvent fractionation unless otherwise stated.

The use of acetone is more advantageous than the results in Tables XIII and XIV might imply. A true picture would have been obtained if the hydrogenations with acetone and ethanol had been stopped at the same linoleate content.

TABLE XIV

| Example (C) | Solvent | IV | Trans | $C_{16}$ | $C_{18}$ | $C_{18}^-$ | $C_{18}^=$ |
|---|---|---|---|---|---|---|---|
| Cottonseed stearin | | | 0 | 48.8 | 2.2 | 11.3 | 36.3 |
| 78 | Ethanol | 45.6 | 17 | 50.7 | 3.5 | 40.0 | 4.5 |
| 79 | Acetone | 41.2 | 25 | 49.1 | 4.0 | 45.5 | trace |

EXAMPLE A26

Resin C was stirred with a 5% NaOH solution in tap-water at 80°C for 5 hours.

EXAMPLE B37

The resin of Example A26 was stirred with 107 mg NaCl and 175 mg $PdCl_2$ dissolved in tap-water. The ratios of resin : NaCl : $PdCl_2$ : water were 85:10:17:10,000.

EXAMPLES C80 to 83

The catalyst B37 was compared with the catalysts B25 and B26 in the hydrogenation of palm oil at 40°C, 1 atm $H_2$, 260g oil and 950 ml acetone. Table XV gives the results obtained.

TABLE XV

| Ex. (C) | Cat. | Initial rate ml/min | React. time mim. | Amount cat. ppm | IV | Trans | $C_{18}$ | $C_{18}$ | $C_{18}^=$ | $C_{18}^=$ |
|---|---|---|---|---|---|---|---|---|---|---|
|  | Palm oil | — | — | — | 52.8 | 0 | 45.7 | 4.4 | 38.4 | 9.6 |
| 80 | B25 | 30 | 27 | 30 | 44.9 | 6 | 47.0 | 4.8 | 43.9 | 2.0 |
| 81 | B26 | 35 | 36 | 30 | 44.8 | 6 | 45.5 | 4.8 | 44.4 | 2.0 |
| 82 | B37 | 250 | 10.5 | 30 | 45.0 | 6 | 44.7 | 4.9 | 45.5 | 1.9 |
| 83 | B37 | 30 | 44 | 15 | 45.0 | 6 | 45.5 | 5.2 | 44.8 | 2.2 |

EXAMPLE A27

Example A20 was repeated except that resin K was used instead of resin C.

Resin K : Permutite HX-IP (SRA 129). This was supplied as being the same as resin C but somewhat more resistant to the action of base and acid.

EXAMPLE B38

Example B26 was repeated using the resin of Example A27 instead of the resin of Example A20.

EXAMPLES C84 and 85

Table XVI gives the results obtained in the hydrogenation of palm oil using catalysts B26 and B38 and the conditions including a quality of oil given in Examples C80 to C83.

TABLE XVI

| Ex.(C) | Cat. | Amount ppm | Activity* | Trans | $C_{16}$ | $C_{18}$ | $C_{18}^{116}$ | $C_{18}^{125}$ |
|---|---|---|---|---|---|---|---|---|
| 84 | B26 | 30 | 40 | 6 | 45.5 | 4.8 | 44.4 | 2.0 |
| 85 | B38 | 30 | 55 | 6 | 44.7 | 5.0 | 45.3 | 2.0 |

*Time in min. to take up 1875 ml $H_2$.

EXAMPLES C86, 87 and 88

Table XVII gives results obtained using the conditions including quality of oil given in Examples C80 to C83 except as indicated. Example B34 was the catalyst.

TABLE XVII

| Ex. (C) | Solvent | Oil: Solvent | Acti-* vity | Cat. ppm | Trans | $C_{16}$ | $C_{18}$ | $C_{18}$ | $C_{18}^=$ |
|---|---|---|---|---|---|---|---|---|---|
| 86 | Acetone | 1 : 3 | 44 | 44 | 6 | 45.5 | 5.2 | 44.8 | 2.2 |
| 87 | Acetone | 1 : 1.5 | 150 | 40 | 6 | 46.1 | 5.0 | 44.8 | 2.2 |
| 88 | Acetone +6% $H_2O$ | 1 : 3 | 122 | 30 | 6 | 45.7 | 5.4 | 44.0 | 2.5 |

*as Table XVI

Resin for Example B39

8 g of Resin K was filled into a column and 100 ml of 8% NaOH was passed through the column at a speed of 0.1 BV/min. The resin was then washed with about 10 BV of water.

EXAMPLE B39

The resin was transferred to a 250 ml Erlenmeyer flask containing 100 ml water and 280 mg $Na_2PdCl_4$. After stirring for 15 hours the catalyst was filtered off, washed with 100 ml water and 25 ml acetone and dried under vacuum for 30 min at room temperature. 7.6 g. of powdered catalyst was obtained.

RESIN FOR EXAMPLE B40

The same technique was used as for the resin for Example B39 except that, instead of the 8% NaOH solution, 100 ml of a 10% HCl solution was passed through the column.

EXAMPLE B40

Example B39 was repeated except that the resin for Example 40 was used. 7.2 g of catalyst was produced as a powder.

EXAMPLE A28

10 g of Resin K was refluxed for 4 hours in a round-bottomed flask with 100 ml of 5% NaOH. After cooling the resin was filtered and washed with 100 ml water.

EXAMPLE B41

Example B39 was repeated except that the resin of Example A28 was used. 7.2 g of catalyst was produced as a powder.

RESINS FOR EXAMPLES B42 and B43

These were prepared as for Examples B39 and B40 except that Resin L was used instead of Resin C.

Resin L (Trade Name: Zerolite 325)

This was a unifunctional strongly acidic cation-exchange resin based on a polystyrene matrix cross-linked with divinyl benzene. Its acidic character was derived from sulphonic acid groups. The total active sites were 2.0 meq./g.

EXAMPLE A 29 (for Example B44)

Example A28 was repeated but using Resin L instead of Resin C.

EXAMPLES B42, 43 and 44

Example B39 was repeated three times using the appropriate resins (see above) and 170 g $PdCl_2$ instead of 280 mg $Na_2PdCl_4$.

EXAMPLE A30

Example A28 was repeated using Resin M instead of Resin K.

Resin M (Trade Name: Ambolite IRC 50)

This was a weakly acidic cation-exchange resin based on a polystyrene matrix cross-linked with divinyl benzene. Its acidic character was derived from carboxylic groups.

EXAMPLE B45

The resin of Example A30 was impregnated with 170 mg $PdCl_2$ dissolved in 100 ml water. After drying 7.0 g of produced catalyst was obtained.

EXAMPLE A31

Example A30 was repeated except that 5% $Na_2CO_3$ was used instead of 5% NaOH.

EXAMPLE B46

Example B45 was repeated using the resin of Example A31. 9.5 g of catalyst was obtained as a very fine powder.

EXAMPLE A32

10 g of Resin G was treated with 5% NaOH as described in Example A28.

EXAMPLE B47

The resin of Example A32 was impregnated with 280 mg $Na_2PdCl_4$ in the manner described in Example B39. 5.5 g of catalyst was obtained.

EXAMPLE A33

Example A28 was repeated using Resin M instead of Resin K and $NaHCO_3$ instead of NaOH.

EXAMPLE B48

Example B39 was repeated using the resin of Example A33. 6.0 g of catalyst was obtained.

EXAMPLE B49

7 g of Resin M was impregnated without any pretreatment with 280 mg $Na_2PdCl_4$ in the manner as described in Example B39. 6.5 g of catalyst was obtained.

EXAMPLES C89 to 96

The catalysts of Examples B39 to B46 were tested in a hydrogenation reaction. For that purpose a 2 l glass reactor, which was constantly kept at a temperature of 40°C and was provided with a stirring device, was filled with 260 g refined palm oil and 950 ml destilled techincal acetone. After addition of the catalyst the reaction vessel was closed and washed with hydrogen. The hydrogen pressure was constantly kept at 78 mm mercury. The reaction was started by actuating the stirring device. The course of the reaction was detected by measuring the uptake of hydrogen. The activity of the catalysts was compared by measuring the time needed for taking up 1875 ml hydrogen, during which the linoleic acid content of the palm oil decreased from 10% to about 2%. The results of these experiments are given in Table XVIII.

TABLE XVIII

| Example (C) | Catalyst | Amount cat. mg Pd/kg oil | Activity (min.) |
| --- | --- | --- | --- |
| 89 | B39 | 30 | 91* |
| 90 | B40 | 60 | none |
| 91 | B41 | 30 | 32 |
| 92 | B42 | 30 | 63 |
| 93 | B43 | 60 | none |
| 94 | B44 | 10 | 41 |
| 95 | B45 | 15 | 51 |
| 96 | B46 | 30 | 45** |

*The reaction stopped after uptake of 1700 ml hydrogen
**The reaction stopped after uptake of 1450 ml hydrogen From this table it appears that resins in the $Cl^-$ or $H^+$ form are not suitable carrier materials. It also appears that an appreciable increase of activity can be obtained by boiling the resins with lye.

After having carried out these experiments the hardened palm oil of Examples C91, C94 and C95 were analyzed on IV, trans content and fatty acid composition. The results are shown in Table XIX.

TABLE XIX

|  | IV | Trans | $C_{16}$ | $C_{18}$ | $C_{18}^-$ | $C_{18}^=$ |
| --- | --- | --- | --- | --- | --- | --- |
| Starting Material | 52.8 | 0 | 45.7 | 4.4 | 38.4 | 10.0 |
| Ex. C91 | 44.8 | 6 | 45.0 | 4.9 | 45.7 | 2.1 |
| do. C94 | 44.9 | 7 | 45.9 | 4.8 | 45.0 | 2.0 |
| do. C95 | 45.1 | 4 | 45.8 | 4.4 | 45.2 | 1.8 |

It is remarkable that not only a high selectivity can be obtained but also the formation of relatively few trans isomers.

EXAMPLES C97, 98 and 99

The catalysts of Examples B47, B48 and B49 were used for a hydrogenation reaction. A 500 ml stirred glass reactor was filled with 30 g neutralized, refined palm oil and 100 ml ethanol. After addition of the catalyst the reaction vessel was closed and carefully washed with hydrogen. The hydrogen pressure was kept on 78 cm mercury and the temperature at 40°C. The reaction was started by activating the stirring device. The activity of the catalysts was compared by measuring the time needed to take up 280 ml hydrogen. The results, together with the fatty acid composition of the hardened oil, are given in Table XX.

TABLE XX

| Ex. (C) | Cat. | Amount mg Pd/kg oil | Activity (min.) | IV | Trans | $C_{16}+C_{16}^=$ | $C_{18}$ | $C_{18}^-$ | $C_{18}^=$ |
|---|---|---|---|---|---|---|---|---|---|
| 97 | B47 | 225 | 31 | 41.7 | 9 | 46.2 | 7.2 | 41.1 | 2.2 |
| 98 | B48 | 75 | 24 | 41.1 | 8 | 46.4 | 5.9 | 43.3 | 1.7 |
| 99 | B49 | 75 | 16 | 41.3 | 5 | 46.1 | 5.5 | 45.5 | 1.8 |
| Starting material | — | — | — | — | 0 | 45.6 | 4.4 | 38.5 | 10.3 |

The lye treatment not only improves the activity but also the selectivity. The weakly basic resin is moreover preferably pretreated with a weaker base, such as sodium bicarbonate.

EXAMPLES A34 and B50

Examples A28 and B41 were repeated using Resin D instead of Resin K.

EXAMPLES C100, 101 and 102

The catalyst of Example B50 was subsequently tested in a hydrogen reaction on the palm oil of Table XIX, palm oil fatty acids and tallow fatty acids. The palm oil fatty acids were obtained from the palm oil according to known standard methods. The hydrogenation was carried out in the reactor of Examples C97 to C99 with the ethanol as the solvent. The results are given in Table XXI.

The catalyst of Example B45 is superior to the other catalysts as regards activity, selectivity and trans isomer formation. The oil from Example 107 shows that soyabean oil hydrogenated according to the invention is an acceptable tableoil.

EXAMPLES B51 and 52

Starting from Resin G, two catalysts were prepared according to the method indicated for the resin of Example B39, except that the carrier of the one catalyst (B51) was pretreated with 100 ml of an 8% NaOH solution and the other (B52) with 100 ml of an 8% sodium bicarbonte solution.

EXAMPLES C108 and 109

The catalysts B51 and B52 were tested on their activity in the hydrogenation of palm oil in the manner as described in Examples C86 to C93. It appeared that

TABLE XXI

| Ex. (C) | Substrate | Amount mgPd/kg oil | Activity (min.) | IV | Trans | $C_{16}$ | $C_{18}$ | $C_{18}^-$ | $C_{18}^=$ |
|---|---|---|---|---|---|---|---|---|---|
| 100 | Palm oil | 150 | 4 | 44.4 | 6 | 45.6 | 5.8 | 43.7 | 2.8 |
| 101 | Palm oil f.f.a. | 150 | 2 | 45.9 | 6 | 46.1 | 6.0 | 44.7 | 2.2 |
| 102 | Tallow f.f.a. | 150 | 2 | 47.2 | 10 | 24.9 | 17.5 | 42.2 | 2.0 |
| Tallow f.f.a. (blank) | — | — | 56.6 | 6 | 24.8 | 15.5 | 38.7 | 7.0 |

Remarkably, no difference in selectivity and formation of trans isomers is found between the oil and the corresponding free fatty acids.

EXAMPLES C103 to 107

The catalyst of Example B45 was used for a hydrogenation reaction on cotton seed stearin, olive oil fatty acids and soyabean oil under the conditions and in the apparatus described in Examples C86 to C93. The results are given in Table XXII.

with an amount of catalyst 30 mg Pd/kg oil both catalysts are not able to take up 1875 ml hydrogen.

With catalyst B51 the reaction stopped after 65 min. after 1450 ml hydrogen had been taken up; catalyst B52 stopped after 46 min. after only 580 ml hydrogen had been taken up. The conversion into the OH$^-$ form of the resin with the aid of a standard column technique does not produce good carrier materials.

EXAMPLE C110

From the palm oil fatty acids of Example C98 sodium

TABLE XXII

| Ex. (C) | Oil | Cat. | Amount mg/kg oil | IV | Trans | $C_{16}$ | $C_{18}$ | $C_{18}^-$ | $C_{18}^=$ | $C_{18}^:$ |
|---|---|---|---|---|---|---|---|---|---|---|
| 103 | fractionated cotton seed st. | B45 | 90 | 55.3 | 23 | 30.7 | 4.2 | 59.6 | 0.3 | |
| 104 | idem | Cu* | 6000 | 58.3 | 35 | 29.3 | 4.5 | 56.3 | 4.2 | |
| | Starting material | — | — | 98.0 | 0 | 29.2 | 2.5 | 17.5 | 47.5 | |
| 105 | olive oil f.f.a. | B45 | 20 | 77.5 | 8 | 13.2 | 4.2 | 78.5 | 3.5 | |
| 106 | idem | 5%Pd/C** | 100 | 64.3 | 18 | 13.8 | 15.8 | 64.7 | 2.6 | |
| | Starting material | — | — | 87.5 | 0 | 14.1 | 3.0 | 69.4 | 11.1 | |
| 107 | Soyabean oil | B45 | 30 | 115 | 11 | 11.4 | 4.2 | 36.8 | 42.3 | 3.5 |
| | Starting material | — | — | | | 10.9 | 3.9 | 23.1 | 53.2 | 7.5 |

*185°C and 5 atm hydrogen pressure
**50°C and 15 atm hydrogen pressure soap was prepared. 30 g of this sodium soap was filled into the reactor of Example C94. After addition of 75 mg Pd/kg substrate of the catalyst of Example B41 a hydrogenation reaction was carried out at 40°C and 1 atm hydrogen pressure. The solvent of this experiment was a mixture of 75 ml water and 75 ml ethanol. After 40 min. the reaction was interrupted after 100 ml hydrogen had been taken up. The mixture of sodium soaps was subsequently converted into the corresponding methyl esters. G.L.C. analysis showed that the linoleic acid content of the palm oil fatty acid soap had decreased from 10.0% to 5.2%. The trans content was 3%.

EXAMPLE C111

The catalyst of Example B44 was used for the hydrogenation of palm oil in tetrahydrofuran as solvent in the reactor and under the conditions of Example C86. A time of 100 minutes was needed to take up 1875 ml hydrogen at an amount of catalyst of 30 mg Pd/kg oil. The linoleic acid content of the palm oil had decreased from 10% to 2%. 0.5% stearic acid was formed, the trans content of the product being 8%.

EXAMPLE C112

The catalyst of Example B41 was used for the hydrogenation of palm oil in the reactor and under the conditions of Example C94. The solvent used during this experiment was acetic acid. The amount of catalyst used was 125 mg Pd/kg oil. After a hydrogenation time of 16 minutes the reaction was interrupted. A fatty acid analysis showed that the linoleic acid content had decreased from 10% to 4.3% and that 1.5% stearic acid had been formed. The trans content was 7%.

EXAMPLE C113

The catalyst of Example B41 was used for carrying out a hydrogenation reaction on dinitrotoluene. The reaction was carried out in the reactor and under the conditions of Example C86. The reactor was filled with 63 mg oxalic acid, 20 ml water, 80 ml ethanol, 15 mmoles dinitrotoluene and 0.1 mmole of catalyst. After a reaction time of 5 hours no further hydrogen was taken up. Analysis showed that 99% of the dinitrotoluene had been converted into the corresponding diamine.

EXAMPLES A35 to 38

5 g of each of resins A, D, F and J, respectively, were refluxed for 4 hours with 5 g NaOH in 100 ml water.

EXAMPLES B53 to 56

The resins of Examples A35 to A38 were treated with $Na_2PdCl_4$ as described in Example B39 except that 200 mg $Na_2PdCl_4$ was used. In the hydrogenation of palm oil the catalyst Example B56 was not active and the catalyst Examples B53 to 55 were active.

The total exchange capacity and the exchange capacity for large molecules before and after treatment were measured for a number of resins. The results are given in Table XXIII.

TABLE XXIII

| Resin | Treatment | Total Exchange Capacity meq/g | Exchange Capacity meq/g for Large Molecules | |
|---|---|---|---|---|
| | | | Before | After |
| A | Example A35 | 3.5[1] | 0.30[2] | 2.1[2] |
| D | Example A36 | 4.0[1] | 0.90[2] | 2.9[2] |
| F | Example A37 | 3.5[1] | 1.3[2] | 2.2[2] |
| J | Example A38 | 3.5[1] | 0.15[2] | 0.6[2] |
| K | Example A28 | 4.0[1] | | 2.2[3] |

[1] Measured as described in A. I. Vogel, Quantitative Inorganic Analysis, 3rd Ed., London, 1965.
[2] Measured as follows: 5 g of the resin was dried, converted to the Cl form with 100 ml HCl, washed with water till the filtrate was chloride-free and dried. About 2 g was then weighed accurately and shaken for 5 minutes with 2 g sodium anthraquinone-2-sulphonate in 250 ml water. The resin was then filtered and the amount of chloride ion in the filtrate measured gravimetrically.
[3] Measured using the method given in K. Hale et al., J. Org. Chem., 1952, 844.

I claim:

1. A process for hydrogenating polyunsaturated fatty acids and their triglyceride esters at about 0°C to about 100°C using about 1 to about 5 atms. hydrogen in the presence of a polar solvent and a supported heavy-metal catalyst in which the heavy-metal is Pd(II), the catalyst-support is an ion-exchange resin consisting essentially of a polystyrene matrix cross-linked with divinyl benzene and at least 2.0 meq/g active sites readily accessible to large molecules and the Pd(II) has been introduced into the salt-form of the resin when the resin is a cationexchange and into the hydroxyl or neutral form when the resin is an anion-exchange resin.

* * * * *